US007888434B2

(12) United States Patent
Kihara et al.

(10) Patent No.: US 7,888,434 B2
(45) Date of Patent: Feb. 15, 2011

(54) AROMATIC POLYAMIDE AND EPOXY GROUP-CONTAINING PHENOXY RESIN

(75) Inventors: Yasuyuki Kihara, Sakai (JP); Yoshiki Takahashi, Sakai (JP); Hidenori Takayama, Sakai (JP); Masanori Imai, Sakai (JP); Yasunori Tanaka, Tokyo (JP); Shinji Naruse, Tokyo (JP); David Wayne Anderson, Richmond, VA (US)

(73) Assignees: Nitto Shinko Corporation, Sakai-shi (JP); E. I. du Pont de Nemours and Company, Wilmington, DE (US); Dupont Teijin Advanced Papers (Japan), Tokyo (JP)

( * ) Notice: Subject to any disclaimer, the term of this patent is extended or adjusted under 35 U.S.C. 154(b) by 284 days.

(21) Appl. No.: 11/915,069

(22) PCT Filed: May 17, 2006

(86) PCT No.: PCT/JP2006/309855

§ 371 (c)(1),
(2), (4) Date: Oct. 30, 2008

(87) PCT Pub. No.: WO2006/123714

PCT Pub. Date: Nov. 23, 2006

(65) Prior Publication Data

US 2009/0215968 A1 Aug. 27, 2009

(30) Foreign Application Priority Data

May 20, 2005 (JP) ............................. 2005-148388

(51) Int. Cl.
*C08L 63/02* (2006.01)
*C08L 77/10* (2006.01)
(52) U.S. Cl. .................................................... 525/423
(58) Field of Classification Search ........................ None
See application file for complete search history.

(56) References Cited

U.S. PATENT DOCUMENTS

| 3,920,602 | A | | 11/1975 | Freed |
| 4,309,473 | A | * | 1/1982 | Minamisawa et al. .... 428/299.1 |
| 4,897,301 | A | * | 1/1990 | Uno et al. .................... 428/209 |
| 6,288,145 | B1 | * | 9/2001 | Miyabo ........................ 523/457 |
| 7,205,346 | B2 | * | 4/2007 | Harashina .................... 524/133 |

FOREIGN PATENT DOCUMENTS

| JP | 59-206460 A | 11/1984 |
| JP | 63-202655 A | 8/1988 |
| JP | 3-237160 A | 10/1991 |
| JP | 3-237161 A * | 10/1991 |
| JP | 10-287808 A | 10/1998 |
| WO | WO 03/046084 A1 * | 6/2003 |

OTHER PUBLICATIONS

Derwent accession No. 1985-008958 for Japanese Patent No. 59-206460 A, Ilzaka et al., Nov. 22, 1984, one page.*
Caplus accession No. 1985:133022 for Japanese Patent No. 59-206460 A, Dainippon Ink and Chemicals, Inc., Nov. 22, 1984, two pages.*

* cited by examiner

*Primary Examiner*—Robert Sellers
(74) *Attorney, Agent, or Firm*—Westerman, Hattori, Daniels & Adrian, LLP

(57) ABSTRACT

A polyamide resin composition which can improve heat resistance and water absorbency while suppressing the deterioration of processability is provided. Provided is a polyamide resin composition having an aromatic polyamide resin and an epoxy group-containing phenoxy resin having an epoxy group in the molecule of the phenoxy resin, wherein the content of the epoxy group-containing phenoxy resin is 30 to 50% by mass.

4 Claims, 1 Drawing Sheet

AROMATIC POLYAMIDE AND EPOXY GROUP-CONTAINING PHENOXY RESIN

TECHNICAL FIELD

The present invention relates to a polyamide-based resin composition, and specifically to an aromatic polyamide-based resin composition.

BACKGROUND ART

Polyamide resins are known to easily form hydrogen bond at amide group in the main molecular chain, to have strong intermolecular force owing to the hydrogen bond, and to readily show crystallinity. Because of the property to readily show crystallinity, the polyamide resins are superior to other resins in terms of heat resistance, resistance to hydrolysis, and other characteristics, and have dynamic strength.

Generally the polyamide resins are manufactured by ring-opening polymerization of ϵ-caprolactam, by polycondensation of a diamine with a dicarboxylic acid, and the like. Characteristics of thus manufactured polyamide resins can be varied by changing the kind of applied diamine, dicarboxylic acid, and the like.

Consequently, the polyamide resins can be used in various applications with the respective resin grades. For example, an aromatic polyamide in which an aromatic compound is used for one or both of diamine and dicarboxylic acid has a rigid aromatic ring in the main molecular chain, thus the aromatic polyamide has higher heat resistance than that of an aliphatic polyamide using an aliphatic compound, thereby being utilized in applications requesting high heat resistance.

Furthermore, the aromatic polyamides have low water absorbency, and are superior in the electric characteristics after absorbing water to the aliphatic polyamides. With the advantageous characteristics, the aromatic polyamides are widely used in electric-insulation applications and the like. The patent document 1 describes that an aromatic polyamide containing a phenoxy resin further decreases the water absorbency.

For the case that a resin is processed by extrusion using an extruder, adequate flowability is requested to the resin. For example, excess flowability induces problems of variations in extrusion rate, inclusion of bubbles, thickness deviation, and the like. Accordingly, the resin composition for that type of processing generally adopts the one having 30 or smaller MFR.

As described before, since the aromatic polyamide resins have rigid aromatic ring in the main molecular chain, they have fewer entanglements of molecules in molten state than those of aliphatic resins. Therefore, if an aromatic polyamide resin is used to improve the heat resistance and the water absorbency of resin composition, the flowability of the polyamide resin composition becomes excessive in the molten state, thus the polyamide resin composition may not be suitable for the above-described processing.

To this point, there is a proposal that the temperature of processing of the polyamide resin composition is decreased to near the melting point of the polyamide resin to decrease the flowability. The patent document 2 describes that a phenoxy resin is added to nylon 46 which is an aliphatic polyamide, thus to decrease the melting temperature, and then the injection molding is conducted at near the melting temperature.

The polyamide resins, however, show abrupt phase change near the melting point compared with other resins because they easily show crystallinity, as described above. Furthermore, the aromatic polyamide resins increase in flowability in the molten state compared with aliphatic polyamides such as nylon 46 owing to the above-described reason. Consequently, the aromatic polyamide resins significantly vary the flowability with a slight change in temperature near the melting point. Therefore, it is substantially difficult to decrease the flowability by decreasing the processing temperature to near the melting point because there is a need of precise control of resin temperature.

As a result, the conventional methods have a problem of difficulty in attaining a polyamide resin composition which has improved heat resistance and water absorbency while suppressing the deterioration in processability.

Patent Document 1
  Japanese Patent Application Laid-Open No. Hei-3-237160

Patent document 2
  Japanese Patent Application Laid-Open No. Sho-63-202655

DISCLOSURE OF THE INVENTION

Problems to be Solved by the Invention

An object of the present invention is to provide a polyamide resin composition which can improve the heat resistance and the water absorbency while suppressing the deterioration of processability.

Means to Solve the Problems

The present inventors have conducted extensive study and found that phenoxy resins, particularly epoxy group-containing phenoxy resins which have epoxy group in the molecule thereof, can improve the flowability of a polyamide resin composition in the molten state, thereby completed the present invention.

To achieve the above object, the present invention provides a polyamide resin composition containing an aromatic polyamide resin and an epoxy group-containing phenoxy resin having an epoxy group in the molecule of the phenoxy resin, wherein the content of the epoxy group-containing phenoxy resin is 30 to 50% by mass.

Advantage of the Invention

Since the present invention adopts an aromatic polyamide resin in the polyamide resin composition, the heat resistance and the water absorbency of the polyamide resin composition can be improved. In addition, since the polyamide resin composition contains a specified quantity of epoxy group-containing phenoxy resin, the excess flowability of polyamide resin composition is suppressed, and the deterioration of processability is suppressed.

DESCRIPTION OF THE REFERENCE NUMERALS

Figure 1:
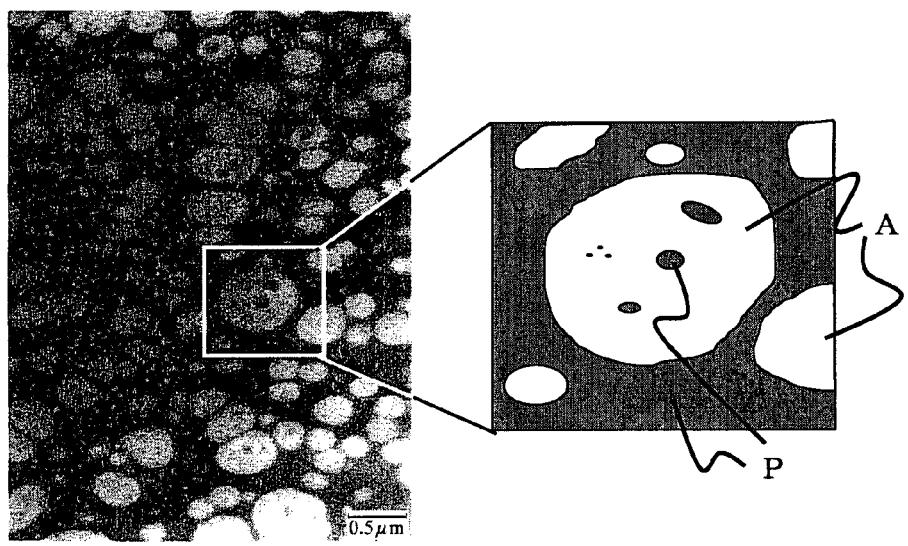
FIG. 1 is a transmission electron microscope picture of a polyamide resin composition according to one embodiment and an explanatory view of part thereof.

A: Portion of aromatic polyamide, P: Portion of phenoxy

BEST MODE FOR CARRYING OUT THE INVENTION

A preferred embodiment according to the present invention is described below.

The polyamide resin composition according to the preferred embodiment is prepared by blending an epoxy group-containing phenoxy resin with an aromatic polyamide resin.

Applicable aromatic polyamide resin includes an aromatic polyamide prepared by, for example, dehydration condensation polymerization of a diamine with a dicarboxylic acid while adopting an aromatic compound to any of the diamine and the dicarboxylic acid.

Applicable diamine includes an aliphatic diamine, an alicyclic diamine, and an aromatic diamine. Applicable aliphatic diamine or alicyclic diamine includes the one expressed by the general formula (1). The $R_1$ in the formula (1) designates an aliphatic or alicyclic alkyl expressed by $C_nH_{2n}$ (n=6-12):

$$H_2N-R_1-NH_2 \quad (1)$$

As applicable diamine, hexiamethylen diamine and/or mixing with 2-methylpentamethylene diamine are always preferred in bringing out superior characteristic under high temperature.

Applicable aromatic diamine includes xylylene diamine.

Applicable dicarboxylic acid includes an aliphatic dicarboxylic acid, an alicyclic dicarboxylic acid, and an aromatic dicarboxylic acid. Applicable aliphatic dicarboxylic acid or alicyclic dicarboxylic acid includes the one expressed by the general formula (2). The $R_2$ in the formula (2) designates an aliphatic or alicyclic alkyl expressed by $C_nH_{2n}$ (n=4-25):

$$HOOC-R_2-COOH \quad (2)$$

Applicable aromatic dicarboxylic acid includes terephthalic acid, methyl terephthalic acid, and naphthalene dicarboxylic acid.

As applicable aromatic dicarboxylic acid, mixing terephthalic acid with isophthalic acid is always preferred in bringing out superior characteristic under high temperature.

The aromatic polyamide resin may contain one kind of diamine and one kind of dicarboxylic acid, and alternatively may contain plural kinds of diamine and plural kinds of dicarboxylic acid in combination. If necessary, other component than diamine and dicarboxylic acid may be added to the resin.

Applicable epoxy group-containing phenoxy resin includes the one expressed by the

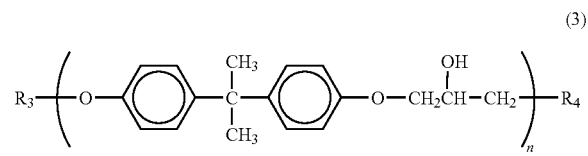

general formula (3), or the like. An epoxy group is introduced to at least one of $R_3$ and $R_4$ in the formula (3):

The epoxy group-containing phenoxy resin may generally be the one having 40,000 to 80,000 of weight-average molecular weight ($M_w$). The weight-average molecular weight ($M_w$) is determined by the GPC method under the following condition, for example.

Reference reagent: TSK reference polystyrene (A-500, A-2500, F-1, F-4, F-20, and F-128: manufactured by Toso Co., Ltd.)

Solvent: THF

Column: GF-1G7B+GF-7MHQ (manufactured by Showa Denko K.K.)

From the point of giving favorable compatibility with the aromatic polyamide resin and of giving easy dispersion, and further from the point of attaining more effective suppression of flowability of the polyamide resin composition, the weight-average molecular weight ($M_w$) is preferably in a range from 50,000 to 60,000. In case of the $M_w$ is less than 50,000, much blister formation at injection and extrusion T-die molding is occurred, it possibly spoils performance of the polyamide resin composition. And, in case of the $M_w$ is exceeding 60,000, lack of flowability possibly spoils moldability of the polyamide resin composition.

Furthermore, in view of more effective suppression of flowability and increasing mechanical strength of the polyamide resin composition at the same blending rate, the epoxy group-containing phenoxy resin preferably has the epoxy equivalents above 10,000 g/eq. In case of the epoxy equivalents less than 10,000, much blister formation at injection and extrusion T-die molding is occurred, it possibly spoils performance of the polyamide resin composition. And possibly mechanical characteristics as represented by tensile strength is also spoiled by it.

The epoxy equivalent is the value determined in accordance with JIS K7236.

The polyamide resin composition according to this embodiment is structured by the above aromatic polyamide resin and the above epoxy group-containing phenoxy resin, where the epoxy group-containing phenoxy resin is mixed by 30 to 50% by mass. The reason to specify the mixing rate of the epoxy group-containing phenoxy resin to that range is that less than 30% by mass fails to attain the effect of suppressing the flowability of the polyamide resin composition, and that more than 50% by mass deteriorates the excellent characteristics such as heat resistance and water absorbency of the aromatic polyamide resin, both of which cases may not attain the polyamide resin composition having these improving effects. A further preferable mixing rate of the epoxy group-containing phenoxy resin is more than 35% by mass and not more than 45% by mass in view of, adding to the above-given characteristics, improving physical properties such as elongation and tensile strength of the polyamide resin composition for extrusion at high extrusion rate.

The polyamide resin composition may further contain a resin other than the aromatic polyamide resin and the epoxy group-containing phenoxy resin, within a range not to deteriorate the advantage of the present invention.

Various additives other than resin may further be added to the resin. Examples of these additives are:

tackiness agent such as alkylphenol resin, alkylphenol-acetylene resin, xylene resin, petroleum resin, coumarone-indene resin, terpene resin, rosin;

bromine compound such as poly-bromo-diphenyl-oxide, tetrabromo-bisphenolA;

halide flame retardant such as chlorinated paraffin, par-chlorocyclodecane;

phosphorous flame retardant such as phosphate ester, halophosphate ester;

hydration metal compound such as hydrated alumina, magnesium hydrate;

flame retardant as antimony trioxide, boron compound;

common chemicals for blending in plastics, such as phenolic, phosphorous and sulphur antioxidant, heat stabilizer, light stabilizer, UV absorber, lubricant, pigment, cross-linking agent, cross-linking assistant, silane-coupling agent, and titanate-coupling agent; and inorganic filler such as silica, clay, calcium carbonate, aluminum oxide, magnesium oxide, boron nitride, silicon nitride, and aluminum nitride. And, especially adding nanometers level particles of montmorillonite or 0.6 mm Kevler® by 0.1 to 5 parts by weight to 100 parts by weight of the polyamide resin composition, for example, improves the resin strength to more than 3 times.

Furthermore, adding any one of triallyl isocyanate, tetra-n-butoxide titanium, tris(2,3-epoxypropyl)isocyanate by 0.1 to 5 parts by weight to 100 parts by weight of the polyamide resin composition, for example, improves the resin strength to 3 times or more. For example, the triallyl isocyanate, tetra-n-butoxide titanium and tris(2,3-epoxypropyl)isocyanate put on sales as "TAIC", "B-1" and "TEPIC-G" available from Nippon Kasei Chemical, Nippon-soda Corp and Nissan Chemical Corp, respectively.

With those mixing components, the polyamide resin composition can be manufactured by a common mixing and blending means such as kneader, pressurized kneader, kneading roll, Bumbury's mixer, and twin-screw extruder. On manufacturing a product using a polyamide resin composition by dry-blending, a method of mixing and blending within the cylinder of extruder can be adopted, at need.

That type of polyamide resin composition is favorably used for injection molding in view of suppressing the air inclusion.

EXAMPLES

The present invention is described below in more detail referring to the examples. These examples, however, do not limit the scope of the present invention.

Example 1

An aromatic polyamide resin (DuPont Zytel® HTN 501) prepared by ternary polymerization of hexamethylene diamine, 2-methylpentamethylene diamine, and terephthalic acid, and a phenoxy resin with epoxidized terminal, having about 52,000 of weight-average molecular weight, (an epoxy group-containing phenoxy resin), were mixed together at a rate of 35% by mass of the epoxy group-containing phenoxy resin, thereby obtaining a mixture of polyamide resin composition. The mixture was extruded to strand from a twin-screw extruder set in a range from a melting point to a decomposition temperature, while melting and blending the mixture. After cooled with water, the strand was cut to pellets by a pelletizer, thus obtained a polyamide resin composition.

Example 2

A polyamide resin composition was manufactured by the same procedure as that of Example 1 except that the mixing rate of the epoxy group-containing phenoxy resin was varied to 40% by mass.

Example 3

A polyamide resin composition was manufactured by the same procedure as that of Example 1 except that the mixing rate of the epoxy group-containing phenoxy resin was varied to 45% by mass.

Comparative Example 1

A polyamide resin composition was manufactured by the same procedure as that of Example 1 except that the epoxy group-containing phenoxy resin was replaced by a common phenoxy resin having about 52,000 of weight-average molecular weight and that the mixing rate of the phenoxy resin was varied to 30% by mass.

Comparative Example 2

A polyamide resin composition was manufactured by the same procedure as that of Comparative Example 1 except that the mixing rate was varied to 40% by mass.

Comparative Example 3

A polyamide resin composition was manufactured by the same procedure as that of Comparative Example 1 except that the mixing rate was varied to 50% by mass.

Comparative Example 4

A polyamide resin composition was manufactured by the same procedure as that of Example 2 except that the epoxy group-containing phenoxy resin was replaced by a bisphenol-A type epoxy resin having about 2,400 of epoxy equivalent, (trade name "Epicoat 1009", manufactured by Japan Epoxy Resin Co., Ltd.).

Comparative Example 5

A sole aromatic polyamide resin without additives was adopted as Comparative Example 5.

Evaluations

Melting Point

Before giving evaluation on the flowability, the melting point of the aromatic polyamide was measured by the DSC method to determine the temperature for evaluating the flowability (Device used: "Pyris" available from PERKINELMER Corp.). In concrete terms, about 5 mg of the sample and separately about 5 mg of alumina as the reference were heated in a nitrogen gas atmosphere at 10° C./min of heating rate to determine the heat absorption. The point where the heat absorption becomes maximum near the temperature of inducing phase change was decided as the melting point. The observation revealed that the melting point of the aromatic polyamide resin used in examples and comparative examples was about 300° C.

(Flowability)

For Example 2 and Comparative Examples 2, 4, 5, the flowability was observed at a temperature higher by 10° C. or more than the melting point which was determined by the melting point measurement, which observed temperature was in a region where the flowability does not significantly vary. That is, the melt flow rate (MFR) was determined at 310° C. and 320° C., respectively, in accordance with JIS K7210. The determination was conducted by attaching an orifice of 0.5 mm in diameter and 8 mm in length to a cylinder of 9.5 mm in diameter, at the above temperature, applying 20 N of load.

As a reference, MFR determination was given also at 330° C. which may induce decomposition of the resin.

The judgment was given on the following criterion based on the situation that resin processing such as film-forming where the resin is processed in a heated and melted state and where relatively high flowability is requested. Thus, the resin giving 20 or smaller MFR observed in commonly applied resins was evaluated as ⊚, the resin giving more than 20 and not more than 30 of MFR was evaluated as ○, and the resin giving far larger than 30 of MFR or the resin which flew very little was evaluated as x. The result is shown in Table 1.

TABLE 1

| | MFR (judgment: g/10 min) | | MFR (reference) |
|---|---|---|---|
| | 310° C. | 320° C. | 330° C. |
| Example 2 | ⊚: 9.1 | ⊚: 17.4 | ○: 26.8 |
| Comparative Example 2 | X: 32.6 | X: 58.4 | X: 84.6 |
| Comparative Example 4 | X: 0 (*) | X: 0 (*) | X: 0 (*) |
| Comparative Example 5 | X: 49.6 | X: 109.1 | X: 152.3 |

(*) No flowability was observed.

Table 1 shows that the resin composition prepared by adding an epoxy group-containing phenoxy resin to the aromatic polyamide resin had adequate flowability as the polyamide resin composition.

(Tensile Test Characteristics)

For Examples 1 to 3 and Comparative Examples 1 to 3, and 5, respective films having about 0.2 to 0.5 mm in thickness were formed. The films were subjected to tensile test (200 mm/min of elastic stress rate, 100 mm of distance between marked lines, and 100 mm of distance between chucks) in accordance with JIS C2111. Table 2 shows thus observed tensile strength and elongation.

TABLE 2

| | Tensile strength (MPa) | Elongation (%) |
|---|---|---|
| Example 1 | 58.9 | 4.5 |
| Example 2 | 60.9 | 17.9 |
| Example 3 | 63.0 | 31.4 |
| Comparative Example 1 | 58.5 | 6.5 |
| Comparative Example 2 | 59.0 | 6.0 |
| Comparative Example 3 | 49.7 | 4.4 |
| Comparative Example 5 | 52.5 | 11.0 |

Table 2 shows that, compared with Comparative Example 5 (sole aromatic polyamide resin), Examples 1 to 3 increase the tensile strength with the increase in the quantity of epoxy group-containing phenoxy resin, and that particularly Examples 2 and 3 increase the elongation also. The elongation become high when the quantity of epoxy group-containing phenoxy resin is in a range from more than 35% by mass and not more than 45% by mass.

In contrast, common phenoxy resin (Comparative Examples 1 to 3) shows no improvement in the tensile strength and the elongation.

(Transmission Electron Microscope Observation)

From the films of Example 2 and Comparative Example 2 used in the tensile test, respective samples having about 0.8 nm in thickness were formed by ultramictromy. After dipping the samples in 4% osmic acid solution, 50° C. for 1 H, the portions of phenoxy resin of the samples stained by osmium were observed by transmission electron microscope (TEM). FIG. 1 shows thus observed TEM for Example 2, and FIG. 2 shows thus observed TEM for Comparative Example 2, respectively.

In both figures, black portions correspond to phenoxy portions stained by osmium, and white portions correspond to the aromatic polyamide resin portions. Black portions are observed in white portions also, this indicates that phenoxy portions were formed in the aromatic polyamide portion.

Figure 2:
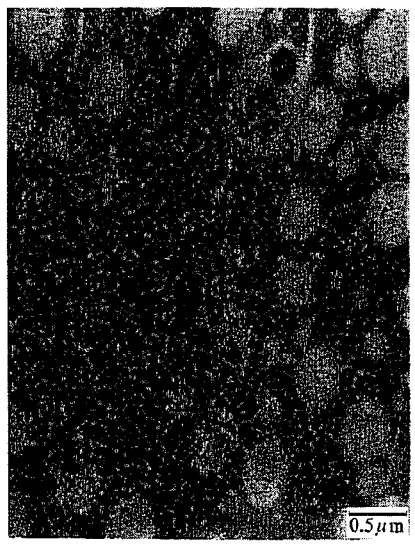
FIG. 2 is a transmission electron microscope picture of a polyamide resin composition with no epoxy group introduced.

Furthermore, in FIG. 1, smaller white portions are observed as compared with it in FIG. 2, this indicates that the aromatic polyamide resin were well dispersed into the polyamide resin composition. For FIG. 1, both of white and black portions were formed as smaller as compared with those in FIG. 2, this indicates that resin dispersion was well in the polyamide resin composition.

Effect by Introduction of Epoxy Group

Comparative Example 6

A polyamide resin composition was manufactured by mixing separately phenoxy and epoxy resins to the aromatic polyamide with the same content as that of Example 2, and blending the phenoxy resin used in Comparative Example 1 and the epoxy resin used in Comparative Example 4 into aromatic polyamide so as to have the same rate of content of epoxy group as that of Example 2. That is, only difference between Comparative Example 6 and Example 2 was that the phenoxy resin has the epoxy group introduced into the molecule.

Figure 3:
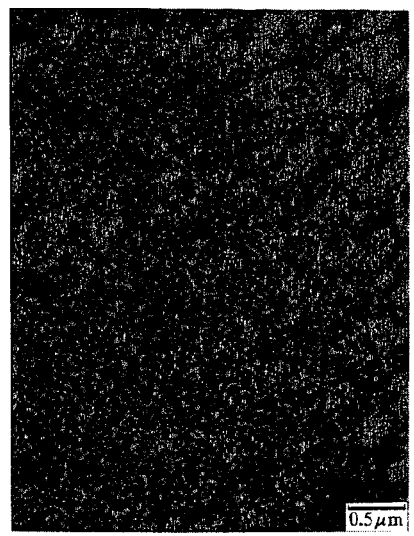
FIG. 3 is a transmission electron microscope picture of a polyamide resin composition with an epoxy group introduced separately from a phenoxy resin.

FIG. 3 shows thus observed TEM for the polyamide resin composition of Comparative Example 6 in the same procedure mentioned above.

In FIG. 3, more small white portions are observed than it in FIG. 2 but not more than it in FIG. 1, and size of black in white portion is big and same as it in FIG. 2.

Furthermore, counting white portions in 4 micron square of each sample by the naked eye through TEM (×50000) observations, the number in FIG. 3 is double to double half as many as it in FIG. 2. And the number in FIG. 1 is triple as many as it in FIG. 2. From this, using the epoxy group-containing phenoxy resin having epoxy group in the molecule brought well dispersion of each resin in the polyamide resin composition in comparison to using separately epoxy and phenoxy resin.

The invention claimed is:

1. A polyamide resin composition comprising an aromatic polyamide resin and an epoxy group-containing phenoxy resin having an epoxy group in the molecule of the phenoxy resin, the content of the epoxy group-containing phenoxy resin being 30 to 50% by mass.

2. A polyamide resin composition for injection molding, comprising the polyamide resin composition according to claim 1.

3. The polyamide resin composition according to claim 1, wherein the content of the epoxy group-containing phenoxy resin is 40 to 50% by mass.

4. A polyamide resin for injection molding, comprising the polyamide resin composition according to claim 3.

* * * * *